UNITED STATES PATENT OFFICE.

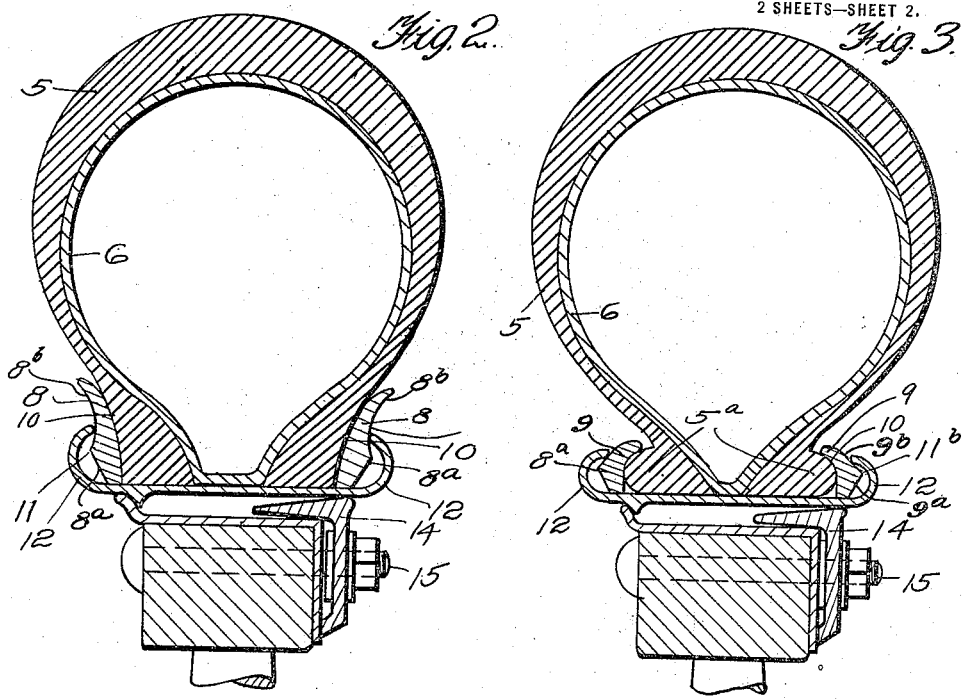
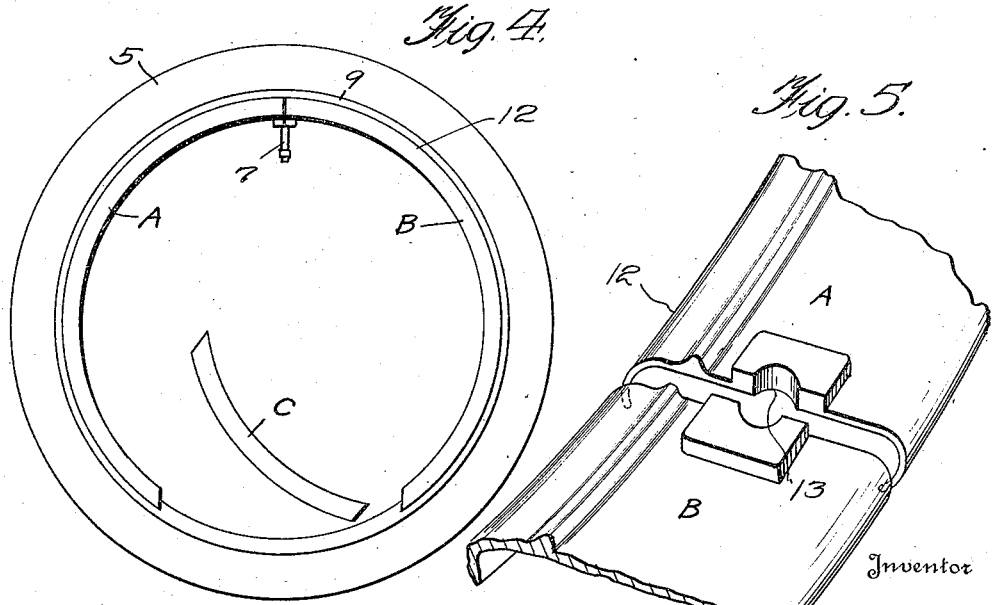

ELMER WILLIAM GINZEL, OF REDLANDS, CALIFORNIA.

SECTIONAL DEMOUNTABLE RIM.

1,426,288.   Specification of Letters Patent.   Patented Aug. 15, 1922.

Application filed March 30, 1921. Serial No. 457,006.

*To all whom it may concern:*

Be it known that I, ELMER WILLIAM GINZEL, a citizen of the United States, residing at East Citrus Avenue, Redlands, in the county of San Bernardino and State of California, have invented certain new and useful Improvements in Sectional Demountable Rims, of which the following is a specification, reference being had therein to the accompanying drawings.

The present invention relates to demountable rims for vehicle wheels and more particularly for automobile wheels, and it has for its object to provide an improved device of this character made in sections and bearing such relation to each other that they may be placed in operative position upon a pneumatic tire, with but very little exertion upon the part of the user, the parts being so arranged that they will be held in approximate, assembled relation by the elasticity of the tire casing when the tire is deflated and will afterward be held very securely in assembled position under the influence of the air pressure within the casing, when the tire is inflated.

Further objects and advantages of the invention will be set forth in the detailed description which follows.

In the accompanying drawing:

Fig. 2 is an enlarged transverse vertical sectional view;

Fig. 3 is a view like Fig. 2 but showing the device adapted to a clincher tire;

Fig. 4 is a side view of the rim and tire with one of the sections of the rim removed;

Fig. 5 is a perspective view of the abutting ends of the two long sections of the rim.

Like numerals designate corresponding parts in all of the figures of the drawings.

Figure 1:
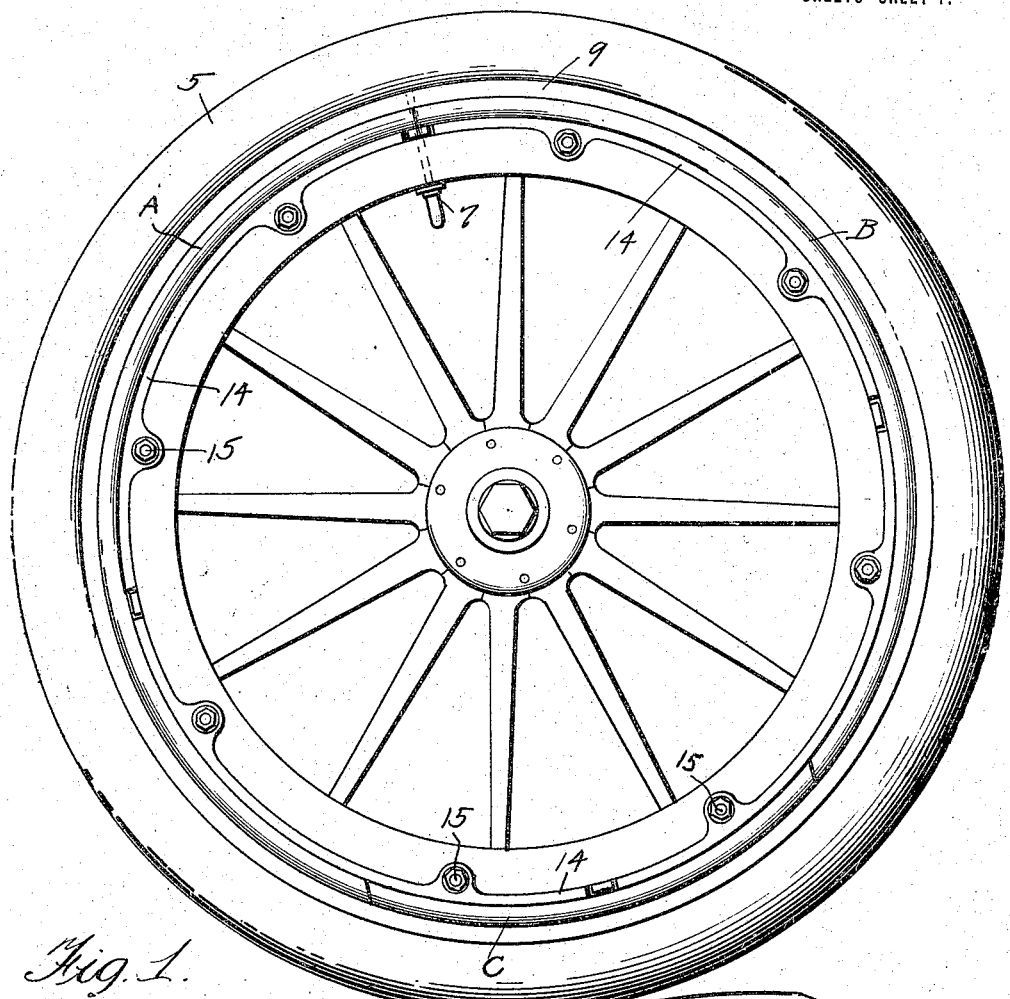
Fig. 1 is a side elevation of a demountable rim and tire, the rim being constructed in accordance with the invention.

Referring to the drawings 5 designates a tire casing of a usual and well known construction, it being understood that this casing receives an inner tube 6 adapted to be inflated through a valve stem 7. These parts are all of the usual and well known construction. In carrying out the invention, I provide a pair of rings 8 and 9, the inner faces 10 of which are shaped to engage the tire casing 5. In Fig. 2, I have shown these rings shaped to engage a straight-side tire casing, while in Fig. 3 I have shown a ring shaped to engage the beads $5^a$ of a clincher casing. In either case the rings are inclined or beveled in the novel manner shown very clearly in Fig. 2. That is, these rings flare outwardly from their inner peripheries, as indicated at $8^a$ and $9^a$, respectively, and are then inclined inwardly, as indicated at $8^b$ and $9^b$, respectively, leaving upon said rings apices 11, $11^a$ which extend entirely around the said rings. The rim is made in a plurality of sections, A, B, and C; each of channel formation and having the inturned lips or flanges 12 along their edges which engage the rings 8 and 9 in a manner hereinafter set forth. Sections A, and B each comprise two-fifths of the circumference of the rim and the section C comprises the remaining fifth of the circumference. The sections A and B come together with a straight or radial cut at the valve 10, the ends of each of said sections having a semicircular recess cut therein, as indicated at 13 for the passage of the valve 10.

In assembling the rim and tire, the rings 8 and 9 are placed in position illustrated in Fig. 2 and then one of the long sections, A or B, of the rim is placed over the inner periphery of these rings and forced outwardly. The extremities of the lips 12 ride up the inclined portions $8^a$ and $9^a$ of the rings forcing the rings to yield inwardly, against the elastic action of the casing, until the extremities of the lips pass over the apices 11, $11^a$ of the rings and ride outwardly over the inwardly inclined portions $8^b$. It is manifest that after this is done the said section A or B will be held in place by the tendency of the inner edges of the tire casing to spring outwardly under their own elasticity. Consequently the operator may then let go of the said section and take up the other long section and put it in place in the same manner, these long sections being brought together at the valve stem 10. Then the short section C is forced outwardly, snapping into place over the apices of the rings in the manner previously described. It is manifest that when the tire is inflated the rings will be pressed very forcibly into the channels formed beneath the overhanging lips or flanges 12 of the rim sections. It will be noted that the cut between the end of the section C and the adjacent ends of the sections A and B are not radial cuts but are at such an angle as to permit of the direct insertion of the short section between the separated ends of the longer sections.

By forming the rim proper in a plurality of sections and by beveling the rings in the peculiar manner set forth so that the several sections are caused to snap into position initially under the elasticity of the tire casing, when the latter is in its inflated position, I provide a rim the several elements of which may be brought into assembled relation to the tire casing, and into assembled relation to each other, and thereafter positively and firmly locked in such assembled position by inflation of the tire. The several parts are so arranged that the initial assembly may be brought about with very little effort upon the part of the user of the device and thus the act of mounting a tire upon a demountable rim is robbed of much of its labor and many of its disagreeable features.

Figure 6:
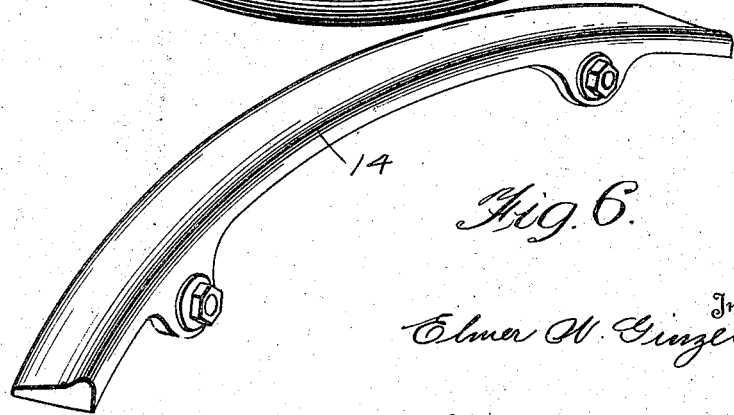
Fig. 6 is a perspective view of a wedging element hereinafter described.

The rim may be held upon the felloe 13 of the wheel by lugs of the usual and well known construction or they may be held in position by wedging elements 14, like those illustrated in Fig. 6. These elements are substantially like the usual well known lug except that they are of such length as to extend from one retaining bolt 15 to the other. I may make these wedging elements of any desired length and in fact contemplate making them of such length and in such number as to substantially fill the space between the rim and the felloe throughout the circumference of the wheel. This is advantageous upon trucks and other heavy vehicles in that it provides a support for the rim at all points.

It is to be understood that the invention is not limited to the precise construction set forth but that it includes within its purview whatever changes fairly come within either the terms or the spirit of the appended claims.

Having described my invention, what I claim is:

1. A rim of the character described comprising a pair of rings adapted to engage the opposite sides of the tire at the inner edge thereof, said rings having outwardly flaring outer side walls, a plurality of rim sections having inturned portions at their opposite edges adapted to ride upwardly over said flaring walls of the rings and to engage with said rings above said flaring portions.

2. A device of the character described comprising a pair of rings adapted to lie upon opposite sides of the tire casing, a plurality of rim sections having inturned lips or flanges about their opposite edges, each of said rings having its outer face inclined outwardly from the inner periphery thereof and then inclined inwardly to constitute an apex intermediate the inner and outer peripheries of the ring.

In testimony whereof I hereunto affix my signature.

ELMER WILLIAM GINZEL.